(No Model.) 4 Sheets—Sheet 1.

J. L. HUBER.
APPARATUS FOR MEASURING ELECTRICAL CURRENTS.

No. 338,596. Patented Mar. 23, 1886.

Witnesses
C. T. Beer
H. W. T. Jenner

Inventor
Joseph Leopold Huber
By Paine & Ladd,
Att'ys.

(No Model.)  4 Sheets—Sheet 2.

J. L. HUBER.
APPARATUS FOR MEASURING ELECTRICAL CURRENTS.

No. 338,596.  Patented Mar. 23, 1886.

Witnesses:  Inventor:
  Joseph Leopold Huber
  By Paine & Ladd,
   Attys.

(No Model.) 4 Sheets—Sheet 3.

J. L. HUBER.
APPARATUS FOR MEASURING ELECTRICAL CURRENTS.

No. 338,596. Patented Mar. 23, 1886.

Witnesses:

Inventor
Joseph Leopold Huber (No Model.)   4 Sheets—Sheet 4.

J. L. HUBER.
APPARATUS FOR MEASURING ELECTRICAL CURRENTS.

No. 338,596.   Patented Mar. 23, 1886.

Witnesses:

Inventor:
Joseph Leopold Huber

UNITED STATES PATENT OFFICE.

JOSEPH LEOPOLD HUBER, OF HAMBURG, GERMANY.

APPARATUS FOR MEASURING ELECTRICAL CURRENTS.

SPECIFICATION forming part of Letters Patent No. 338,596, dated March 23, 1886.

Application filed August 5, 1885. Serial No. 173,612. (No model.) Patented in Germany December 29, 1883, No. 28,749.

*To all whom it may concern:*

Be it known that I, JOSEPH LEOPOLD HUBER, a subject of the German Emperor, and a resident of Hamburg, in the German Empire, have invented certain new and useful Improvements in Apparatus for Measuring Electric Currents, of which the following is a specification, and for which I have obtained a patent in Germany, No. 28,749, bearing date December 29, 1883.

This invention relates to apparatus for measuring electric currents; and it consists in the detailed construction and combination of the parts hereinafter fully described and claimed, by which the quantity or tension, or both the quantity and tension, of any circuit of electricity passing through the measuring apparatus is automatically registered.

Figure 1:
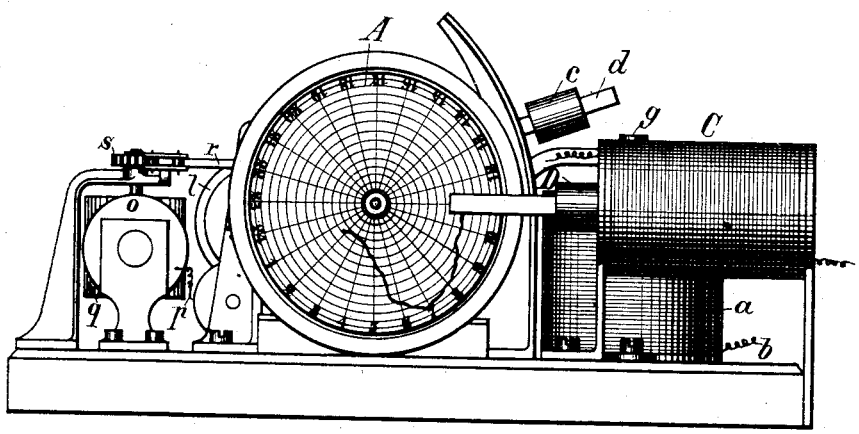
Figure 2:
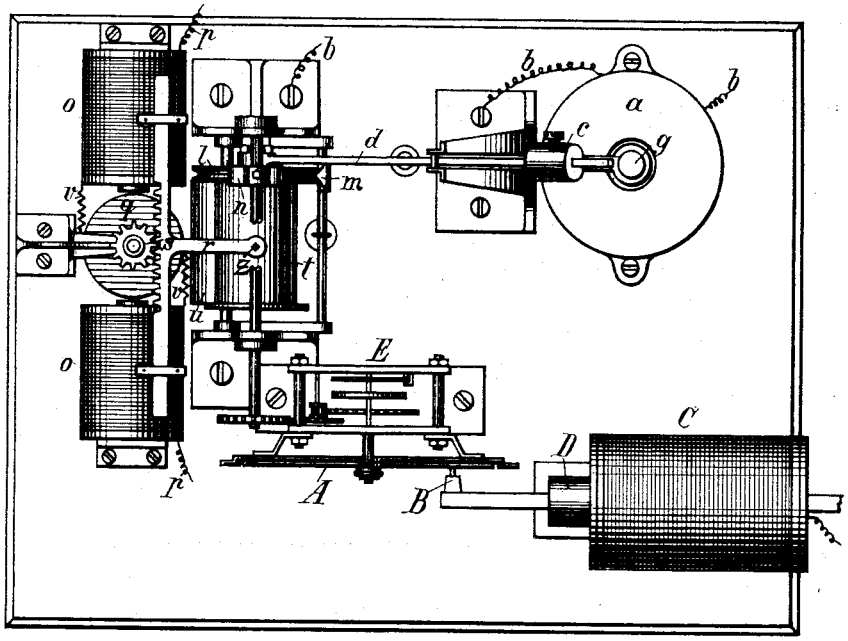
Figure 3:
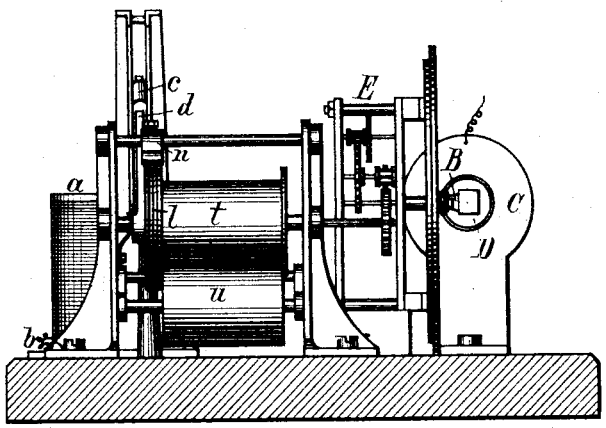
Figure 4:
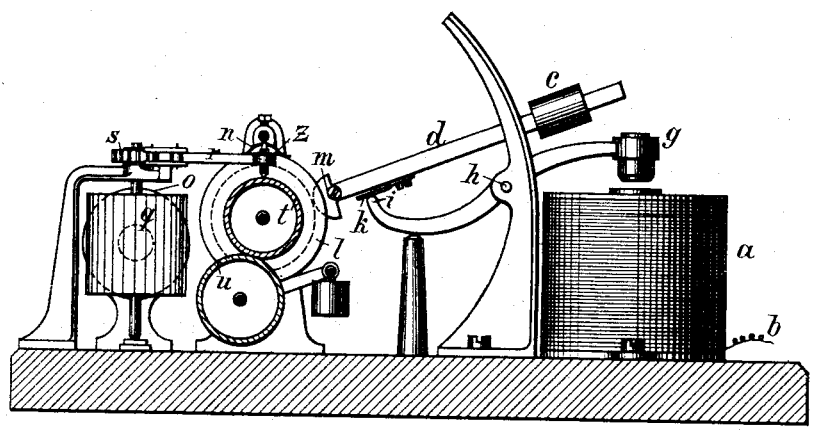

In the drawings, Figure 1 is a front elevation of the measuring apparatus. Fig. 2 is a plan view of the same. Fig. 3 is a side elevation of the apparatus, partly in section. Fig. 4 is a front elevation of the mechanism for setting the apparatus in motion, also partly in section.

Similar letters of reference indicate corresponding parts in all the figures.

This apparatus is intended to be used, principally, to indicate the quantity or tension of electric energy produced by a central source; but it also may be employed to indicate separately the quantity or tension of electricity supplied to different establishments from the central source. An electro-magnet, $a$, is inserted within any branch of the circuit containing sufficient resistance to be measured and registered. The conducting-wires $b$ of this branch are attached to the said electro-magnet in such manner that the circuit is closed only when the lever $d$ rests upon the extremity $i$ of the anchor $g$, as shown in Fig. 4 of the drawings. The anchor $g$ is pivoted at $h$ in the anchor-bracket, and as soon as the circuit is closed the said anchor is drawn down against the electro-magnet $a$, and thereby raises the lever $d$, which is provided with a contact-spring, $k$, against which the extremity $i$ of the anchor presses. The electro-magnet then becomes currentless, releases the anchor $g$, and allows the lever $d$ to resume its former position. The circuit being again closed, the operation of raising the lever is again repeated. A friction-wheel, $l$, is journaled upon the same shaft upon which the lever $d$ is pivoted, and this wheel $l$ is made to revolve intermittently by means of a friction-clutch, $m$, affixed to the side of the said lever, which is also provided with weight $c$ near its free end. The friction-clutch $m$ is pivoted eccentrically to the lever $d$, so that it engages automatically with the wheel $l$ and moves it in one direction only.

$n$ is a friction-brake, which presses upon the wheel $l$, and prevents any return motion from taking place.

A simple form of registering device may be used. This is shown in the drawings; but as it cannot be claimed specifically in this application its manner of operation is not fully described.

When this device is used, a drum, $t$, is secured upon the same shaft as the wheel $l$ and rotates with it. A friction-roller, $u$, is placed beneath the drum $t$, and a paper band is wound between them and around the circumference of the drum $t$, so that the said paper band is advanced by the rotary motion of the said drum. Two electro-magnets, $o$, are inserted in the main circuit by means of the conductors $p$.

$q$ is a disk or roller pivoted between the said magnets $o$. This disk is composed of a number of iron plates or strips, and is maintained in its normal position by means of the springs $v$, or other equivalent devices.

A toothed wheel, $s$, is secured upon the same shaft as the disk $q$ and turns with it. This wheel $s$ gears with the rack $r$, which carries the pointer or mark $z$, which bears upon the band or the drum $t$ and registers the fluctuations of the current. A second registering device may also be used. This is driven by means of a train of wheels, E, to which motion is imparted by means of a pinion secured upon a continuation of the shaft which carries the friction-wheel $l$. This train of wheels E sets in motion a disk, A, which rotates slowly. This disk may be placed horizontally, vertically, or in any inclined position, as found most convenient. The disk A rotates only when the current passes through the conducting-wires, and this rotation is so regulated that the disk performs one rotation in a certain stipulated unit of time with a given quantity of electricity passing through the main current.

B is a pointer or marker, which slides before the disk A. This pointer may derive its motion from the disk $q$, or it may be operated by a solenoid, C, to the core D of which it may be attached. The current to be measured is made to pass through the solenoid C, so that the core D projects more or less according to the intensity of the said current.

The disk A may be marked with concentric circles and radial lines, to facilitate the reading off of the measurements made upon it.

Having thus described my invention, what I claim as new, and desire to secure by Letters Patent, is—

1. In an apparatus for measuring and registering electric currents, the combination of an electro-magnet, the anchor $g$, pivoted in a suitable bracket and actuated by the said magnet, a vibrating lever operated by the said anchor, a disk deriving intermittent rotary motion from the said lever, a marker pressing on the said disk, and an electrical measuring device attached to the said marker and moving it according to the intensity of the current, substantially as and for the purpose set forth.

2. In an apparatus for measuring and registering electric currents, the combination of an electro-magnet, the anchor $g$, pivoted in a suitable bracket, the lever $d$, having spring $i$, pressing on the end of the anchor, a disk deriving intermittent rotary motion from the lever $d$, a marker pressing on the said disk, and an electrical measuring device moving the said marker according to the intensity of the current, substantially as and for the purpose set forth.

3. In an apparatus for measuring and registering electric currents, the combination of an electro-magnet, the anchor $g$, the lever $d$, having spring $k$ and friction-clutch $m$, the friction-wheel $l$, the brake $n$, a disk rotated by the said friction-wheel, a marker pressing on the said disk, and a solenoid for moving the said marker according to the intensity of the current, substantially as and for the purpose set forth.

In testimony that I claim the foregoing as my invention I have signed my name, in the presence of two witnesses, this 10th day of July, 1885.

JOSEPH LEOPOLD HUBER.

Witnesses:
DIEDRICH PETERSEN,
EMIL HAASE.